US012582093B2

(12) United States Patent
Østedgaard

(10) Patent No.: US 12,582,093 B2
(45) Date of Patent: Mar. 24, 2026

(54) PORTABLE UNIT FOR DOSING OF A DISINFECTANT HOOF BATH REMEDY FOR LIVESTOCK

(71) Applicant: BD Equipment ApS, Haderslev (DK)

(72) Inventor: Bjørn Drews Østedgaard, Hjørring (DK)

(73) Assignee: BD EQUIPMENT APS, Haderslev (DK)

( * ) Notice: Subject to any disclaimer, the term of this patent is extended or adjusted under 35 U.S.C. 154(b) by 49 days.

(21) Appl. No.: 18/688,883

(22) PCT Filed: Sep. 5, 2022

(86) PCT No.: PCT/IB2022/000542
§ 371 (c)(1),
(2) Date: Mar. 4, 2024

(87) PCT Pub. No.: WO2023/031671
PCT Pub. Date: Mar. 9, 2023

(65) Prior Publication Data
US 2025/0000056 A1     Jan. 2, 2025

(30) Foreign Application Priority Data
Sep. 3, 2021    (DK) .............................. PA202100854

(51) Int. Cl.
*A01K 13/00*          (2006.01)
*A61D 7/00*           (2006.01)
(52) U.S. Cl.
CPC .............. *A01K 13/001* (2013.01); *A61D 7/00* (2013.01)

(58) Field of Classification Search
CPC ............................ A01K 13/001; A01K 13/003
See application file for complete search history.

(56) References Cited

U.S. PATENT DOCUMENTS

| | | | | |
|---|---|---|---|---|
| 3,118,427 A | | 1/1964 | Stanzel | |
| 3,155,072 A | * | 11/1964 | Owens | A61D 11/00 601/166 |
| 3,935,839 A | | 2/1976 | Goodwin | |
| 4,622,035 A | * | 11/1986 | Palmer | A61M 35/10 604/289 |
| 6,086,609 A | * | 7/2000 | Buckley | A61D 9/00 607/104 |
| 7,654,228 B1 | * | 2/2010 | Graham | A01K 13/001 119/665 |
| 8,220,231 B2 | * | 7/2012 | Ruetenik | A01L 3/06 54/82 |

(Continued)

FOREIGN PATENT DOCUMENTS

WO        2005082318 A1      9/2005

OTHER PUBLICATIONS

International Search Report mailed on Jan. 17, 2023, by the European Patent Office for International Application No. PCT/IB2002/000542, 2 pages.

*Primary Examiner* — Ebony E Evans
(74) *Attorney, Agent, or Firm* — Boone IP Law

(57)                    ABSTRACT
A portable device for dispensing a disinfectant in liquid form to effect complete or partial healing of a lameness in a livestock responsive to the disinfectant; wherein the portable device includes: a liquid-tight reservoir bag; an emitter unit; and a flexible hose connecting the reservoir bag to the discharger unit when using the unit.

21 Claims, 6 Drawing Sheets

(56)          References Cited

U.S. PATENT DOCUMENTS

| 2015/0156989 | A1* | 6/2015 | Ruetenik | ............. | A01K 13/007 |
| | | | | | 168/28 |
| 2016/0150762 | A1 | 6/2016 | Borde | | |
| 2017/0006826 | A1 | 1/2017 | Torres | | |

* cited by examiner

PORTABLE UNIT FOR DOSING OF A DISINFECTANT HOOF BATH REMEDY FOR LIVESTOCK

TECHNICAL FIELD

In accordance with the present invention there is herein detailed a portable device (1) for dosing of a disinfectant on liquid form for achieving full or partial healing of a lameness in livestock, which lameness is responsive to the disinfectant.

BACKGROUND

Within cattle herds, it is well known in the industry that dairy cows, especially dairy cows belonging to high-performing dairy breeds, do not fully utilize their production potential due to various cattle diseases, such as lameness. Lameness, which is a general non-specific diagnostic term within the industry, occurs in the individual cow as a consequence of one or more diseases, either infectious or non-infectious, such as, for example, sole ulcers/crushing (Pododermatitis circumscripta), digital dermatitis, bale rot (Erosio ungulae), neoplasms (Limax), gangrenous foot abscess (Phlegmona interdigitalis), foot abscess (Pododermatitis) and/or cleft inflammation.

Within the cattle industry, it is generally used that the farmer can soothe/cure certain types of lameness by hoof bathing the individual cow or the entire herd in a disinfectant liquid. In a classic hoof bath procedure, the cattle are led through a narrow passage, in which an elongated hoof bath is set up, approx. 1×2 m2 containing approx. 200 liters of disinfectant hoof bath, which the cattle, due to the narrow passage, are forced to cross with all hooves under water at least once.

For example, the occurrence of digital dermatitis in a cattle population (cattle herd) can be reduced by offering the herd hoof baths with hydrated lime in which the hooves are washed on the first day of treatment, with the treatment repeated after two days. Such an approach has been shown to reduce the incidence of digital dermatitis in observed herds from 50 percent to 10-15 percent over a period of five years when the treatment is repeated regularly. For both hoof baths, the mixing ratio is 25 kg hydrated lime per 200 liters of water.

It is recognized that a disinfecting hoof bath has a positive effect on the lameness of cattle, as long as the hoof bath is clean, but with each passage the hoof bath deteriorates due to contamination, for example from feces and the like, which are added to the hoof bath during the cow passages. Observations indicate that after a short period of use e.g., with less than 50 cow passages of the hoof bath, the positive effect of the disinfectant hoof bath is very questionable, perhaps the hoof bath is now, on the contrary, acting as a source of infection for diseases that can be transmitted to the cows that are healthy, but which also goes through the hoof bath. Unfortunately, since there is often no focus on this aspect from the farmers' side, many farmers let their hoof baths be used by the entire herd (Danish conditions typically approx. 100-400 cattle) for each new mixing of the disinfecting hoof bath, with a corresponding reduction in the effectiveness of the treatment.

A further problem with normal hoof bath treatment is that the typical treatment effect is short i.e., only the time that the claw is actually below the water table, typically approx. 2-8 sec. However, if the cow has pain in the leg, the leg is often not supported at all, and the hoof bath is therefore ineffective on the most diseased leg. Hoof baths especially do not work in the case of spring lameness, or if it is a question of cattle with several bad legs. On the contrary, they will rush through the hoof bath due to discomfort, and the treatment time achieved will be very short, often as short as approx. 2 sec. A healthy cow, on the other hand, will not mind a treatment with, for example, hydrated lime (pH~9-10), but for healthy cows hoof bath treatment mainly has a negative effect due to the risk of etching the outer skin etc.

In US 2016150762 A1, a backpack intended to be worn by a human user is described, which can be filled with, for example, disinfectants for use on a livestock, and sprayed by the same user on an infected area of a livestock, so that, for example, wound treatment can take place in the field.

In U.S. Pat. No. 3,118,427, a suspended bag is described for transferring e.g., a disinfectant to the back of a cattle by capillary seepage from the bag's gut to the cattle, where the cattle receive the treatment at fixed stations where the said bag can be suspended, for example in the barn or in the field.

Within cattle herds, it is also known to treat lameness in cattle that is responsive to a disinfectant e.g., salicylic acid, by using individual bandages comprising the disinfectant, which is applied to an observed skin lesion in an animal requiring treatment until healing has occurred. These can be placed anywhere on the patient's leg, depending on where the disease is. If a cow is very lame, it is normal to trim the cow's hooves at the same time as applying the bandage with salicylic acid.

Whereas such individual dressings have advantages in that the dressing can be arranged to remain in position at the skin lesion until healing has occurred, long-acting dressings are limited to containing depot amounts of the disinfectant, which typically limits the usable disinfectants to dry substances such as, for example, powders, gels, etc. Alternatively, the depot of the disinfectant must be refilled regularly.

At the same time, there are many farmers who opt out of hoof trimming and bandaging if a cow is close to calving. It is a recognized danger that the cow may be provoked to throw the calf due to the treatment of hoof trimming and bandaging, due to the stressful effect of the treatment on the cow, including that the cow is pacified in a hoof trimming box (hoof box), where the cow is restrained with straps under the belly and legs are lifted/forced off the ground so that the hoof trimmer can access the hoof and the diseased area. This can cause the cow to react by kicking and rocking back and forth in the straps of the box, with danger both to herself and the hoof trimmer, and with an increased risk of fetal loss due to the stressful situation for the cow.

A further problem with bandage treatment is that there is an increased risk of damaging the cow's hocks if the bandage is applied too tight or for too long, or if the cow's leg swells, whereby the bandage can cut through the skin and into the flesh and tendons, with irreparable bandage damage as a result.

A related problem between hoof baths and wound dressings is that, where it is recognized that weakly acidic treatments (such as salicylic acid pH~6) are often better than basic treatments in the treatment of cattle's skin disorders, such weakly acidic treatments can only be used to a small extent by hoof bath treatment, as the environment in the stable generally is highly alkaline as a result of urea from the cattle's urine and the like, whereby acidic disinfectants are quickly neutralized.

A further problem in the treatment of lameness in a livestock using disinfectants is that the livestock voluntarily seeks to avoid the treatment because the treatment is often associated with local, but short-lived, pain or discomfort. A cattle during treatment can therefore react with strong movements that can be a danger to a treating professional when using the disinfectant, which is minimized by a cattle's use of the herein disclosed portable device (1).

These and further problems are proposed to be solved with the present invention by the provision of a portable unit for passive dosing of disinfectant in liquid form to produce complete or partial healing of a lameness in a livestock, which lameness is responsive to the disinfectant. The invention ensures that disinfectants, especially acidic disinfectants, in liquid form against lameness in cattle can also be used in the treatment of lameness in cattle.

It is a further advantage of the present invention that, with small modifications, the portable device according to the invention can also be used by other hoofed and hooved domesticated animals in need of the treatments mentioned herein, such as horses, donkeys, mules, camels, dromedaries, and/or reindeer. Any of these domesticated animals can experience the diseases described herein to varying degrees and can therefore benefit from the portable device described herein, when this is suitably adapted to the physiology of the individual domesticated animal.

SYNOPSIS OF THE INVENTION

The present disclosure concerns in an aspect a portable device (1) for dispensing a disinfectant in liquid form to effect complete or partial healing of a lameness in a hoofed or hoof-bearing domesticated animal, which lameness is responsive to said disinfectant; wherein said portable device (1) comprises:

a liquid-tight reservoir bag (2) defining a bag interior (21) in which a volume of said disinfectant can be contained, a bag inner side (22) which encloses said bag interior (21), and a bag outer side (23), whereby a bag wall (27) is defined between said bag inner side (22) and said bag outer side (23), and comprising at least one bag opening (24,25) from the bag interior (21) to the surrounding space, such that said at least one bag opening (24,25) spans said bag wall (27) between said bag inner side (22) and said bag outer side (23);

a discharge unit (3) arranged to discharge said disinfectant from said bag interior (21) onto an area of the skin of a hoofed or hoof-bearing domesticated animal during use and comprising a nozzle (31) for regulating a flow rate of said disinfectant through said discharge unit (3);

a flexible hose (4) for establishing a liquid flow connection (41) for said disinfectant from said bag interior (21) through said at least one bag opening (24,25) to said discharge unit (3) through said flexible hose (4) during use;

wherein said portable device (1) further comprises one or more fastening means (5a-e) for attaching said portable device (1) to a hoofed or hoof-bearing domesticated animal when using and mounting, respectively, said reservoir bag (2), discharge unit (3), and flexible hose (4).

In a second aspect, the present invention concerns a set of parts (2,3,4,5), comprising a reservoir bag (2), a discharge unit (3), a flexible hose (4), and one or more fastening means (5a-e) for fastening said reservoir bag (2), said discharge unit (3) and said flexible hose (4) on a hoofed or hoof-bearing domesticated animal in use, which set of parts when assembled forms a portable device (1) for dosing a disinfectant in liquid form according to at least one of the herein detailed embodiments of the said portable device (1).

In a third aspect the present invention concerns a tool (7) for attaching the herein described portable device (1) to a domesticated animal, which tool (7) permits that when a spring element (70) is bent into two unequal halves, when an outer member (76) is moved towards the spring element (70), a portable device (1) according to the present invention further comprising therefore arranged pockets (61a,61a', 61b,61b'), which portable device (1) is carried on said tool (7) by the herein detailed pairwise holding elements (71a, 71a'), (71b,71b') by that these pairwise holding elements have been inserted into the therefore arranged pockets (61a,61a',61b,61b') comprised on the portable device (1), then first that Velcro element on that wing member (6a,6b) of the portable device (1) carried by a short half of the spring element (70a) will swing towards the leg of the livestock, and thereafter that Velcro element on the wing member (6a,6b) carried by a long half of the spring element (70b), whereby the portable device (1) is assembled around the leg of the livestock before use.

DETAILED DESCRIPTION

Figure 1:
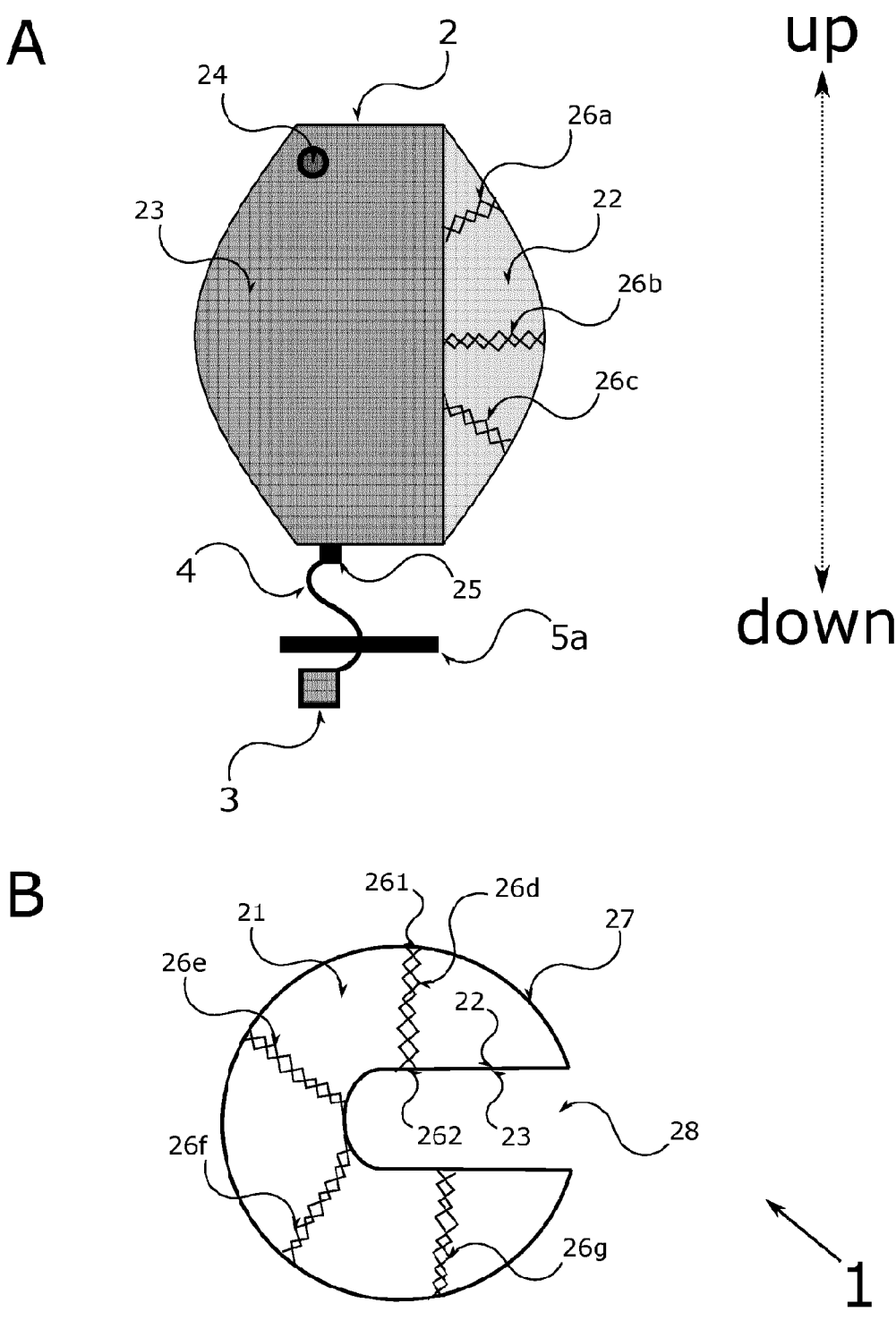
FIG. 1: An embodiment of the present invention.

In accordance with the present invention (c.f., FIG. 1) there is herein detailed a portable device (1) for dispensing a disinfectant in liquid form to effect complete or partial healing of a lameness in a hoofed or hoof-bearing domesticated animal, which lameness is responsive to said disinfectant; wherein said portable device (1) comprises: a liquid-tight reservoir bag (2) defining a bag interior (21) in which a volume of said disinfectant can be contained, a bag inner side (22) which encloses said bag interior (21), and a bag outer side (23), whereby a bag wall (27) is defined between said bag inner side (22) and said bag outer side (23), and comprising at least one bag opening (24,25) from the bag interior (21) to the surrounding space, such that said at least one bag opening (24,25) spans said bag wall (27) between said bag inner side (22) and said bag outer side (23); a discharge unit (3) arranged to discharge said disinfectant from said bag interior (21) onto an area of the skin of a hoofed or hoof-bearing domesticated animal during use and comprising a nozzle (31) for regulating a flow rate of said disinfectant through said discharge unit (3); a flexible hose (4) for establishing a liquid flow connection (41) for said disinfectant from said bag interior (21) through said at least one bag opening (24,25) to said discharge unit (3) through said flexible hose (4) during use; wherein said portable device (1) further comprises one or more fastening means (5a-e) for attaching said portable device (1) to a hoofed or hoof-bearing domesticated animal when using and mounting, respectively, said reservoir bag (2), discharge unit (3), and flexible hose (4).

With said use of one or more fastening means (5a-e) for fastening said portable device (1) on a livestock when in use and mounting respectively the said reservoir bag (2), discharge unit (3) and flexible hose (4) there is achieved, for example, that the animal cannot avoid unwanted treatment, or, as discussed below, create a temporal memory of a connection between treatment and of the animal wearing the portable device described herein.

It is generally, and as is clear to the person skilled in the art, possible to fasten the portable device (1) according to the invention to a livestock before use using loose belts or straps etc., but it is preferred that the portable device (1) includes the one or more fastening means (5a-e) mounted in advance on the said reservoir (2), discharge unit (3) and flexible hose (4), as herein described below. Thereby, attachment is improved, and the handling of the portable device (1) while being attached to a livestock is made easier.

As stated above, the present invention comprises a portable device (1) for dosing a disinfectant in liquid form to produce complete or partial healing of a lameness in a livestock, which lameness is responsive to the disinfectant. Examples of suitable disinfectants are mentioned herein but are generally known to those skilled in the art and are therefore not, as a starting point, covered by the present invention.

As described and shown in FIG. 1, the portable device (1) according to the invention comprises a liquid-tight reservoir bag (2) which defines a bag interior (21) in which a volume of the disinfectant can be contained, a bag inner side (22) which encloses the bag interior (21), and a bag outer side (23), whereby a bag wall (27) is defined between said bag inner side (22) and said bag outer side (23).

As will be clear to the person skilled in the art, any liquid container can in principle fulfill the function—to store a volume of the liquid disinfectant before use—such as the liquid-tight reservoir bag (2) mentioned herein, including boxes, boxes and/or bottles, as long as these are liquid tight. However, the present invention is purposively delimited from rigid, inflexible liquid containers, since these, as will be clear from the discussion below, will for the most part trigger attempts from the animal on which the portable device (1) according to the invention is clamped during treatment, on tearing or detaching the device (1) from the animal's body, as the animal easily recognizes rigid objects as foreign bodies. The present inventor, however, has found that bags, or synonymously sacks, containers, and the like, which are flexible and can adapt to the part of the animal's body on which the bag, sack, container or the like is fastened, do not trigger the animal's instinct to detach the clamped portable device (1) according to the invention. The design is intended not to cut, abrase, or be a nuisance when the livestock is lying down.

As will become apparent from the following, it is not necessary that the liquid-tight reservoir bag (2) solely comprises said bag interior (21), for example the liquid-tight reservoir bag (2) can include two or more bag interiors, such that two or more different disinfectants can find use according to the invention.

Typically, the mentioned volume of the disinfectant will be up to 10 kg of liquid, in the case of aqueous solutions thus approx. 10 l aqueous solution. Such a weight will not be perceived by an adult cattle of 1 ton as being a foreign object, for example the weight of mud dragged along on a rainy day can reach such approx. 10 kg. Smaller volumes, such as 7.5 kg, 5 kg, 2.5 kg, or 1 kg of liquid are also considered in this context to be typical volumes for the disinfectant in said liquid-tight reservoir bag (2), depending on the size of the livestock that is intended to carry the present portable device. In general, it is within the competence of the treating cattle breeder (e.g. dairy farmer), hoof trimmer or veterinarian (and thus outside the scope of this invention) to assess what volume of disinfectant is desired when treating the livestock in question, and thereby select a liquid-tight reservoir bag (2) having a suitable volume of said bag interior (21). The above-mentioned typical volumes are thus indicative of the maximum volume of a filled bag interior (21), but in themselves not decisive for this invention.

According to the invention, said liquid-tight reservoir bag (2) comprises a bag inner side (22) which encloses a bag interior (21) and a bag outer side (23), whereby a bag wall (27) is defined between said bag inner side (22) and said bag outer side (23).

In general, and as mentioned, the liquid-tight reservoir bag (2) must be manufactured in such a way, and of such materials, that the liquid-tight reservoir bag (2) is flexible and can adapt to the body shape of a livestock on which the liquid-tight reservoir bag (2) is clamped down. Suitable materials can be, for example, raw rubber, latex rubber, flexible plastic, e.g., PVC, etc., including such aforementioned materials comprising fiber-reinforcing materials, such as woven and/or Kevlar-reinforced textiles. Such flexible and reinforced materials suitable for livestock are well known to those skilled in the art of livestock farming and are not further described herein.

In general, it will be expected that when the portable device (1) according to the invention is fastened to a livestock, then the portable device (1) will during use (alone by virtue of the fact that an adult livestock can weigh over a ton), and even if the animal is willing to wear the device (1) according to the invention be at risk of being exposed to severe wear. It is thus to be expected that said bag wall (27), defined between said bag inner side (22) and bag outer side (23) can have a thickness of up to 1 cm, but is preferably no thicker than 0.5 cm, in order to minimize that the animal carrying the device (1) according to the invention, seeks to tear off the portable device (1). At the same time, the device (1) can adapt to the space under the animal when it lies down.

In order for the liquid-tight reservoir bag (2) to be filled with the disinfectant and emptied during use, it is necessary to establish at least one bag opening (24,25) between the bag interior (21) and the surrounding space, such that the at least one bag opening (24,25) spans the bag wall (27) between the bag outer side (23) and the bag inner side (22).

It is generally the intention that the liquid-tight reservoir bag (2) shall be attached to the leg of the animal requiring treatment during use (see below), but in general it is sufficient that the liquid-tight reservoir bag (2) is attached to such a place on the body of the animal requiring treatment that a upside-down direction (see FIG. 1) in relation to the earth's gravity field is established between the liquid-tight reservoir bag (2) and the discharge unit (3), such that the liquid-tight reservoir bag (2) can be emptied, at least partially, through the discharge unit (3) under the influence of gravity.

If the material from which the bag wall (27) is formed is sufficiently thin and flexible, typically in which said bag wall (27) is between 1-3 mm, it is not necessary to establish an air intake option for the bag interior (21) to compensate for the discharge negative pressure, as this can be compensated through the atmospheric pressure collapse of the bag interior (21) as the bag interior (21) is emptied of the disinfecting liquid. However, such solutions will typically require that the aforementioned bag wall (27) is formed from the aforementioned textile-reinforced materials in order to achieve the necessary wear resistance during use of the portable device (1) according to the invention. In an embodiment it is accordingly contemplated that said bag wall (27) is formed of a material that allows compensating for the discharge under-pressure through atmospheric pressure collapse of said bag interior (21) timed with said bag interior (21) being emptied of said disinfecting liquid According to this invention, this portable device (1) further comprises a flexible hose (4) for establishing when in use a liquid flow connection (41) for said disinfectant from said bag interior (21) through said at least one bag opening (24,25) to said discharge unit (3) through said flexible hose (4).

In the sense of the present invention, a flexible hose (4) is to be understood as meaning that the flexible hose (4) is bending flexible in the longitudinal direction, which is defined by the direction of flow of said disinfectant through the flexible hose (4), but is essentially non-bending flexible in the cross-sectional direction defined perpendicular to the direction of flow of said liquid through the flexible hose (4) from the liquid-tight reservoir bag (2) to the discharge unit (3).

Such flexible hoses (4) are well known to the person skilled in the art, e.g., garden hoses and/or vacuum hoses meet the above conditions, and typically these are characterized by the flexibility in the most flexible longitudinal direction being at least 10 times, but preferably at least 50 times, or at least 100 times greater than the flexibility in the cross-sectional direction of the hose. Formally, this can be expressed by the ratio between the persistence length of the flexible hose in the longitudinal direction of the hose and the recovery ability of the flexible hose in the cross-sectional length of the hose, where the recovery ability is proportional to the material thickness and cross-sectional stiffness of the hose wall.

In general, it is necessary to ensure that the flexible hose (4) can be adapted in the direction of flow to the body of the animal that is to carry the portable device (1), but at the same time prevent the flexible hose (4) from permanently collapsing if said animal lie down during discharge of liquid from the liquid-tight reservoir bag (2) to the discharge unit (3). In particular, it is important to ensure that the liquid flow can subsequently be re-established when the weight of said animal no longer exerts pressure on the flexible hose (4).

However, it is not in itself a problem that the flow of liquid from the liquid-tight reservoir bag (2) to the discharge unit (3) is interrupted in use if a cattle carrying the portable device (1) lies down (and if said cattle is a milk-producing cow, it is even desirable that the flow of liquid is interrupted while the cow rests lying down). This is because a milk-producing cow does not, or only to a limited extent, produce milk in a standing position, but also ceases to produce milk in a lying position if the cow is disturbed, including disturbed by the application of a disinfectant to an area of the cow's body affected by lameness, including affected by lameness and therewith associated open or closed wound areas.

Thus, in certain embodiments of the present invention, it is desirable that said flexible hose (4) is chosen so that a flow of a liquid through said flexible hose (4) is interrupted under the influence of pressure from a lying animal, to which said portable device (1) is clamped but restored when said pressure influence ceases.

If the flexible hose (4) is essentially without cross-sectional stiffness, the shape of the hose can be restored solely by the pressure effect from the flowing disinfectant, but in general it is advantageous, and in this invention preferred, that the flexible hose (4) is shape-restoring after a pressure exposure, such that the flexible hose (4) recovers its shape after pressure exposure. Such shape-restoring hoses are generally well known to those skilled in the art and include, for example, garden hoses and vacuum hoses.

In a particularly preferred embodiment of the present invention the portable device (1) accordingly comprises shape-restoring flexible hose (4).

In a preferred embodiment of the present invention, said flexible hose (4) comprises one or more fastening means (5a), such that said flexible hose can be attached to said livestock during use.

Figure 2:
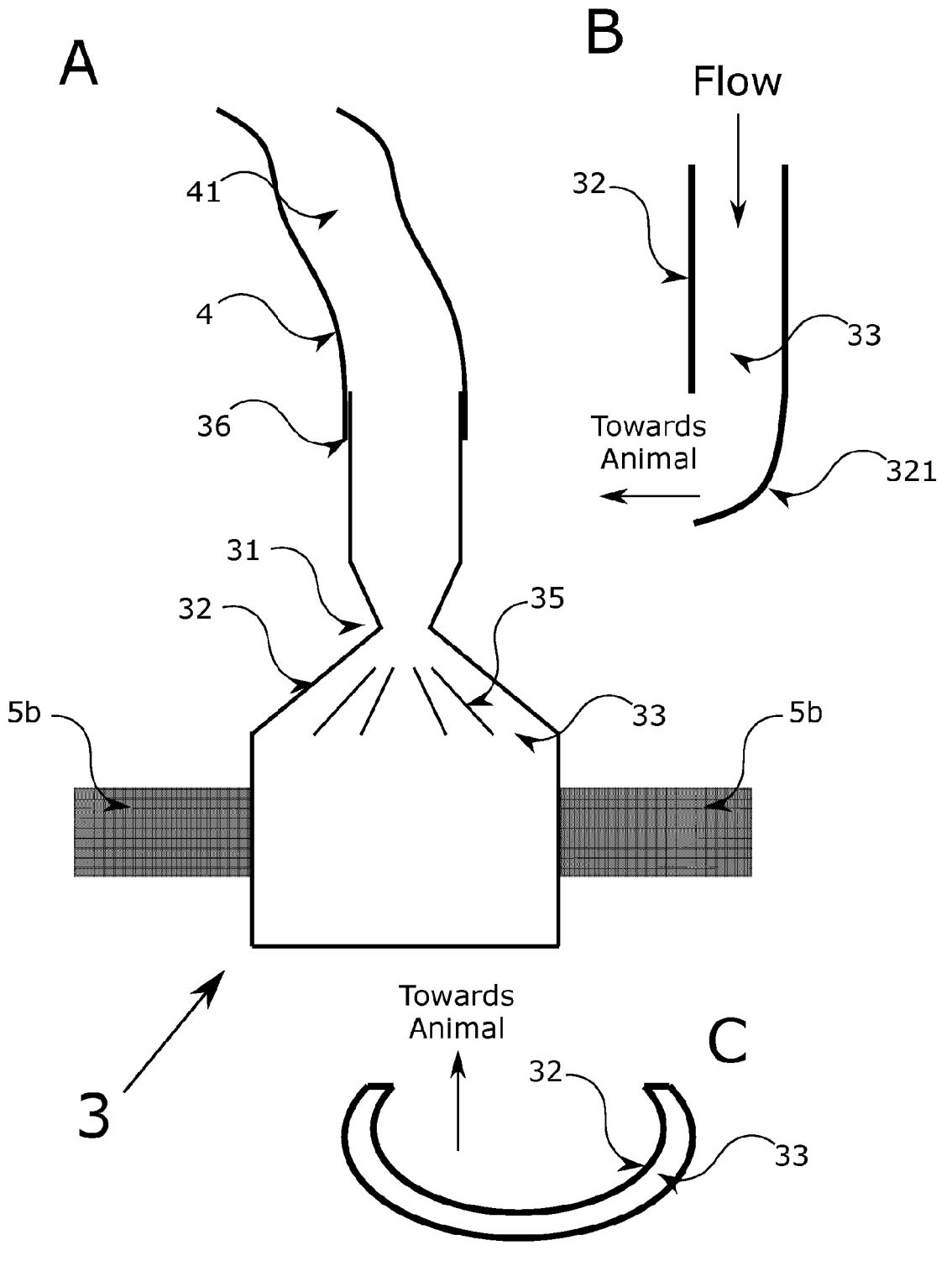
FIG. 2: An embodiment of a discharge unit.

According to the present invention, the present portable device (1) comprises a discharge unit (3) arranged to discharge said disinfectant from said bag interior (21) onto an area of an animal's hide in use and comprising a nozzle (31) for regulating a flow rate of said disinfectant through said discharge unit (3). An exemplification of a preferred embodiment of said discharge unit (3) is described herein below and shown in FIG. 2.

FIG. 2A shows said exemplification of the present discharge unit (3) in cross-section in the direction of flow of the liquid stream parallel to a leg of an animal, on which the discharge unit (3) in a preferred embodiment is thought to be attached by means of at least one (5b) of said fastening means (5a-e). FIG. 2B shows said discharge unit (3) in a preferred embodiment in cross-section perpendicular to said animal's legs in use. FIG. 2C shows a section of said discharge unit (3) in cross-section perpendicular to said flow direction.

According to a preferred embodiment (FIG. 2A) of the present discharge unit (3) comprising a nozzle (31), the discharge unit (3) is constructed as a flow-through body comprising a body (32), which encloses a flow-through interior (33) that allows a flow of a liquid to pass the discharge unit (3) from a connection section (36) of said flexible hose (4), through said nozzle (31) and to an opening (34) in said body (32).

In an embodiment of this, said connection section (36) and said flexible hose (4) respectively comprise complementary couplings, such as, for example, a male and a female part of a click-lock coupling.

In an embodiment thereof, the aforementioned discharge unit (3) comprises distributor ribs (35) arranged in said flow-through interior (33) downstream of said nozzle (31) such that a flow of said disinfectant that passes said nozzle (31) can be distributed evenly over the whole of said flow-through interior (31) and pass said opening (34) as an evenly distributed liquid flow.

According to an embodiment (FIG. 2B), the present discharger unit (3) can comprise a guide (321) at said opening (34), which turns a liquid flow towards a cattle when using said discharger unit (3). Depending on the opening angle of said guide (341) to the animal's leg, on which the discharger unit (3) is clamped, a larger or smaller area on the animal's leg can be washed directly using the portable device (1) according to the invention.

According to a preferred embodiment (FIG. 2C), a present discharger unit (3) can be designed to enclose a section of a cattle's leg, on which the discharger unit (3) is attached. Basically, since a cattle leg is a 3-dimensional object, it is preferred that the discharge unit (3) is adapted to the shape of the cattle's leg (cf. FIG. 2C), but in certain situations, such as a situation with a high and fast flow of disinfectant, it may be sufficient to have a nozzle or a slit opening that can be directed towards the area requiring treatment on the animal's leg.

Finally, said portable device (1) may, as preferred, comprise one or more fastening means (5a-e) for attaching said portable device (1) to a livestock during use. Useful fastening means are generally known to the person skilled in the art and may include, for example, Velcro straps or straps with buckles or the like. Velcro straps in particular are preferred, as these can be closed around the animal's body, including the animal's legs, without the animal thereby risking scratch injuries. Due to the weight and strength of livestock, velcro straps for livestock use are stronger than for human use, but such Velcro straps intended for livestock are generally well known to those skilled in the art and are not further described herein.

A problem with the treatment of lameness in a livestock using disinfectants is that the livestock voluntarily seeks to avoid the treatment because the treatment is often associated with local, but short-lived, pain or discomfort. A livestock being treated can therefore react with strong movements that can be a danger to a treating professional when using the disinfectant, and thus also when using the present portable device (1).

It is thus preferred that the present portable device (1) further comprises an opener that allows opening for a flow of said disinfectant when using this portable device (1) according to the invention. Thereby, the portable device (1) according to the invention can be attached and fastened to the livestock during use without the latter experiencing discomfort during the attachment, and subsequently a treating professional can open a flow of disinfectant from the reservoir bag (2) and out via the discharge unit (3) without being in danger from the livestock.

The present portable device (1) for dispensing a disinfectant in liquid form according to the invention, further comprising in an embodiment an opener allowing opening for a flow of said disinfectant from said reservoir bag (2) to said discharge unit (3).

If the treatment is to be repeated, however, it is advantageous that the livestock does not experience a temporal or spatial relationship between the treating professional fastening the device (1) according to the invention on the livestock and the discomfort of the treatment. It is thus preferred that said opener can be operated remotely.

A removable clamp attached around the flexible hose (4) can in one embodiment constitute said opener. In a preferred embodiment, said removable clamp is connected to a cord that allows the treating professional to pull the clamp off the flexible hose (4) while the treating professional is at a distance from the animal.

Figure 3:
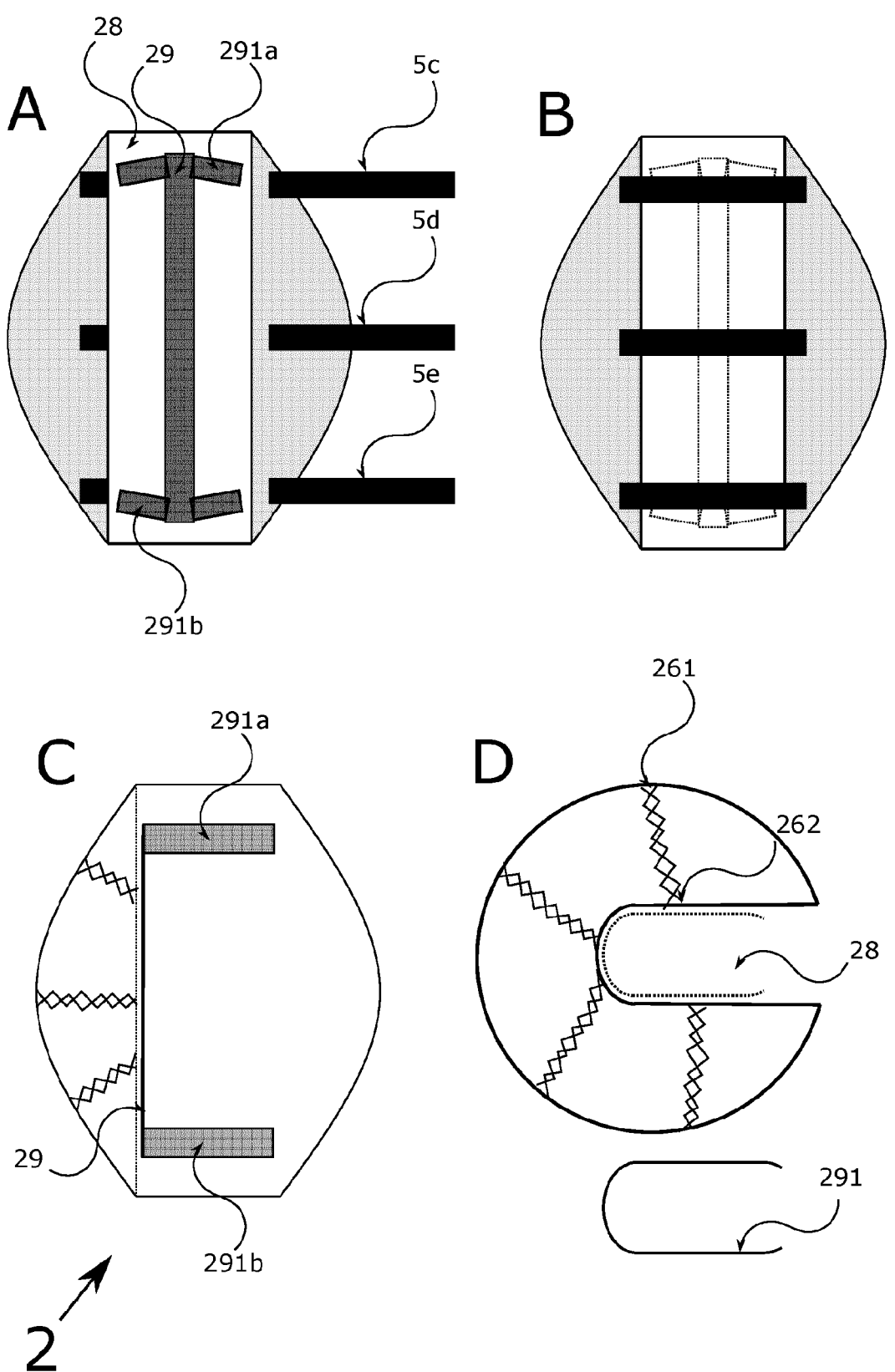
FIG. 3: An embodiment of a reservoir bag.
Figure 4:
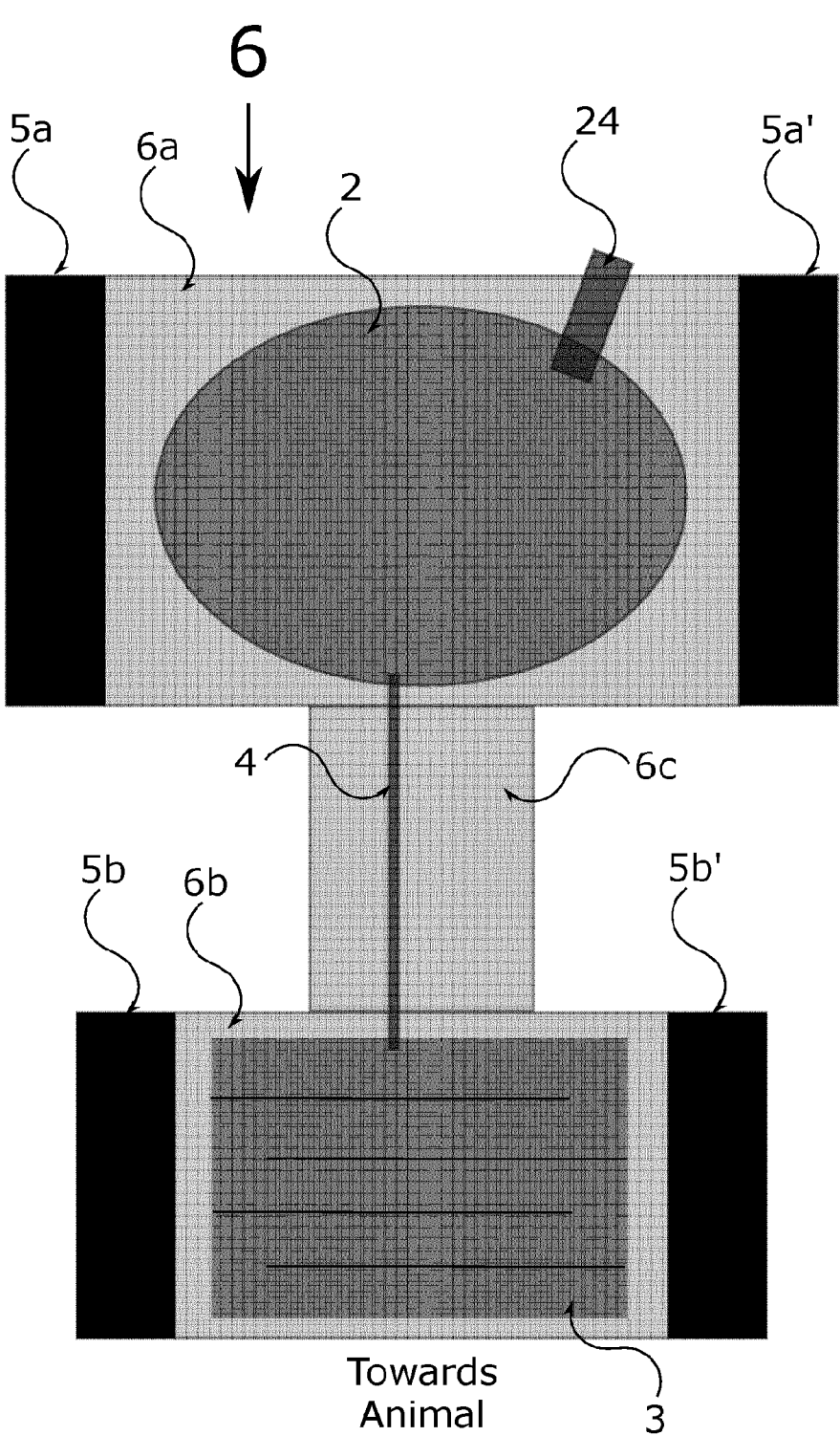
FIG. 4: An embodiment of an assembled portable device.

With reference to FIGS. 1, 3 and 4, certain preferred embodiments of said reservoir bag (2) shall be described in more detail herein.

According to the present invention, the portable device (1) for dosing a disinfectant in liquid form comprises at least one bag opening (24,25) in said liquid-tight reservoir bag (2) for use when establishing said liquid flow connection (41) for said disinfectant from said bag interior (21) through said at least one bag opening (24,25) to said outlet unit (3) through said flexible hose (4). In an embodiment of this, said at least one bag opening (24,25) and said flexible hose (4) respectively comprise complementary couplings, such as, for example, a male and a female part of a click-lock coupling.

In a preferred embodiment of the portable device (1) according to the invention said flexible hose (4) comprises respective complementary couplings against both a respective complementary coupling comprised on said at least one bag opening (24,25) and against a respective complementary coupling included on said connection section (36).

For the treating professional, it is generally not appropriate to fasten said reservoir bag to the animal with filled disinfectant, and it is therefore preferred that said reservoir bag comprises at least two bag openings (24,25), preferably opposite arranged in said reservoir bag (2), such that when said reservoir bag (2) is fastened to a livestock, then the reservoir bag (2) will present a liquid discharge opening (25) to which said flexible hose (4) can be connected and positioned lower in the reservoir bag (2) in relation to the gravity field than a liquid filling opening (24) also included in the reservoir bag (2).

In order to fill disinfectant before use, the liquid filling opening (24) in certain embodiments includes a coupling for connection to a reservoir of disinfectant, e.g., a male or a female part of a click-lock coupling.

Depending on the intended use, the liquid filling opening (24) can be open to the atmosphere during use of the portable device (1) according to the invention, but in general it is preferable that the liquid filling opening (24) can be closed against the atmosphere, for example with a lid, for example a screw cap. This ensures that the animal, on which a portable device (1) according to the invention is clamped, during prolonged treatments is not forced to remain in an upright position but can lie down as needed and desired. In certain embodiments of the liquid filling opening (24), the liquid filling opening (24) includes a pressure equalization valve to counteract negative pressure in the reservoir bag (2) when it is emptied through the liquid discharge opening (25) during use.

In a particularly preferred embodiment (cf. FIG. 1 and FIG. 3) of the present portable device (1) the aforementioned reservoir bag (2) comprises a plurality of spacers (26a-g) arranged in said bag interior (21), each respective spacers (26a-g) attached to at least two respective attachment positions (261,262) on said bag inner side (22), and wherein each respective spacer (26a-g) is partially compressible in a respective longitudinal direction defined between said two respective attachment positions (261,262) on said bag inner side (22). The purpose of said partially compressible spacers (26a-g) arranged in the interior of the reservoir bag (2) is to promote acceptance of the clamped portable device (1) by a livestock carrying a clamped portable device (1) according to the invention, as the reservoir bag (2) thereby is prevented from collapsing around the livestock.

When the reservoir bag (2) includes said spacers (26a-g), it is advantageous to combine the reservoir bag with said liquid filling opening (24) comprising a pressure equalization valve.

It has proven advantageous if said spacers (26a-g) are made of a rubber-elastic material, such as raw rubber or latex rubber, whereby the spacers partly become resistant to the content of chemicals in said disinfectant, and at the same time do not possess such rigidity that the spacers (26a-g) can damage the reservoir bag (2) during use. In a preferred embodiment, said spacers (26a-g) are designed as a double helix shape (also known as a mouse staircase) folded by two strips of the rubber elastic material.

In a preferred embodiment (cf. FIG. 1 and FIG. 3) of said reservoir bag (2), the reservoir bag (2) comprises a recess (28) in the reservoir bag (2) designed to allow the reservoir bag (2) to enclose the leg of an animal in use. The advantage here is that said reservoir bag (2) can be fastened to the animal's leg when in use, near the point of use of the disinfectant, whereby said flexible hose (4) only needs to be quite short. At the same time, a natural up-down direction will be defined for the portable device (1) when used in relation to the gravity field.

In one embodiment, a stiffener (29), preferably a metallic stiffener or a stiffener made of hard plastic, is arranged in said recess (28), which can help ensure that the reservoir bag (2) does not move after tightening, otherwise it is pressed together in (in) said up-down direction. Preferably, one or more fastening means (5c-5e) are placed on the outer side (27) of the reservoir bag (2) along said recess (28), for use when fastening the reservoir bag (2) to the leg of an animal after the animal's leg has been inserted in said recess (28). In an embodiment of said stiffener (29), this includes one or more leg clamps (291a, 291b) that can enclose and clamp the reservoir bag (2) until it can be clamped onto the leg of an animal in use.

In a preferred aspect of the present invention, the afore-mentioned portable device (1) consist of a set of parts (2,3,4,5), comprising a reservoir bag (2), a discharge unit (3), a flexible hose (4), and one or more fastening means (5a-e) for fastening said reservoir bag (2), said discharge unit (3) and said flexible hose (4) on a hoofed or hoof-bearing domesticated animal in use, which set of parts when assembled forms a portable device (1) for dosing a disinfectant in liquid form according to at least one of the herein detailed embodiments of the said portable device (1). Before use, said set of parts (2,3,4,5) can then be assembled and subsequently fastened onto the animal and taken into use. Thus, a set of parts (2,3,4,5) is described herein, comprising a reservoir bag (2), a discharge unit (3), a flexible hose (4), and one or more fastening means (5a-e) for fastening of said reservoir bag (2), said discharge unit (3) and said flexible hose (4) on a livestock in use, which set of parts when assembled forms a portable device (1) for dosing a disinfectant in liquid form according to at least one of the embodiments mentioned herein of said portable device (1). However, it is preferred, cf. above regarding the said one or more fastening means (5a-e), that these are previously fixed to the said reservoir bag (2), discharger unit (3) and flexible hose (4), so that these do not have to be retrofitted.

It is advantageous to deliver said portable device (1) as a set of parts, thereby making it possible for the treating professional to select a reservoir bag (2) with the appropriate volume of said bag interior (21) for the intended treatment and also to be able to select said discharge unit (3) so that a given nozzle (31) contained in said discharge unit (3) can be adapted to the intended discharge rate of the disinfectant during the intended treatment, whereby an intended treatment by the treating professional can be easily adapted to the individual livestock requiring treatment or other hoofed or hooved livestock.

Figure 5:
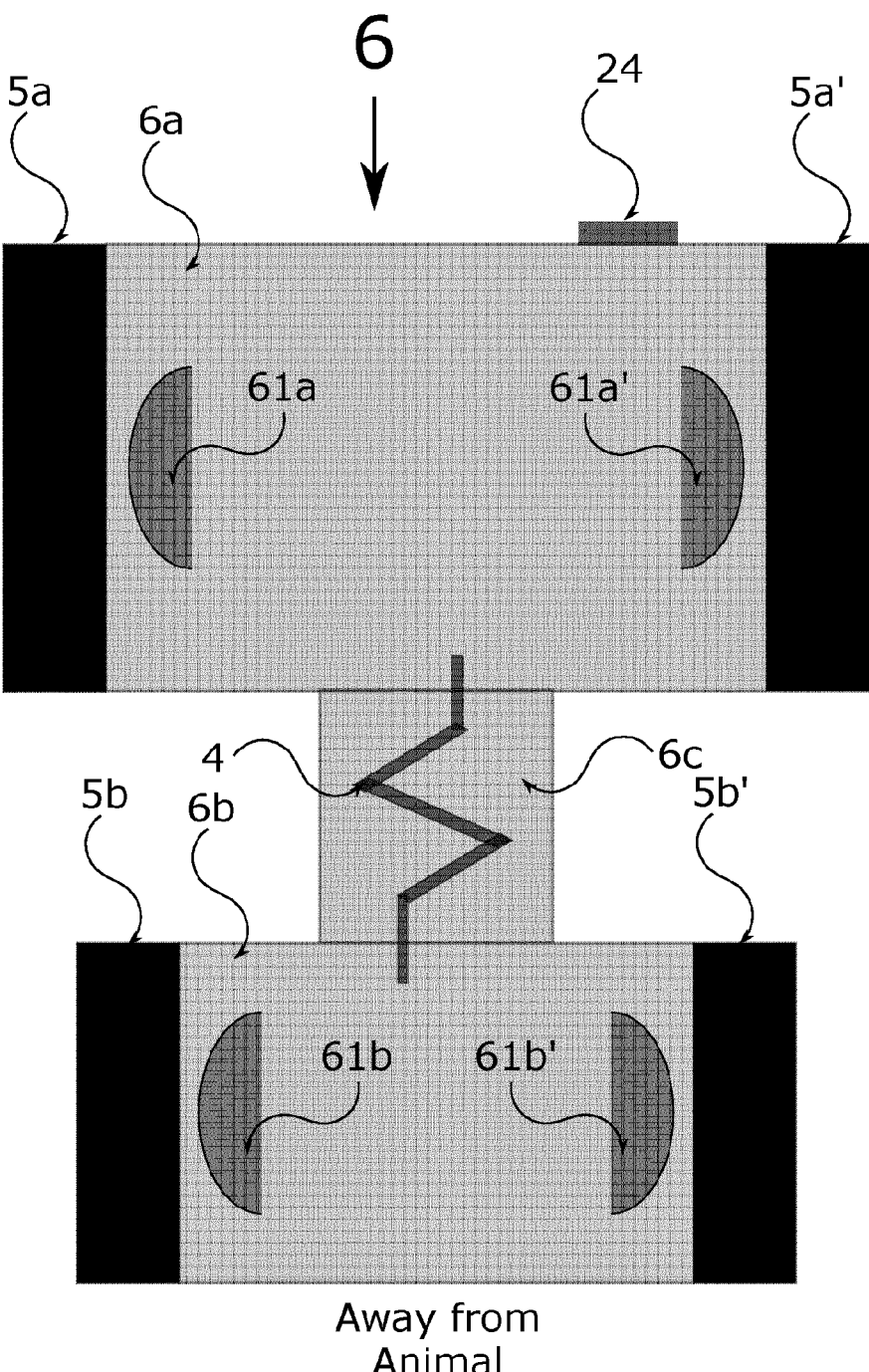
FIG. 5: An embodiment of an assembled portable device.
Figure 6:
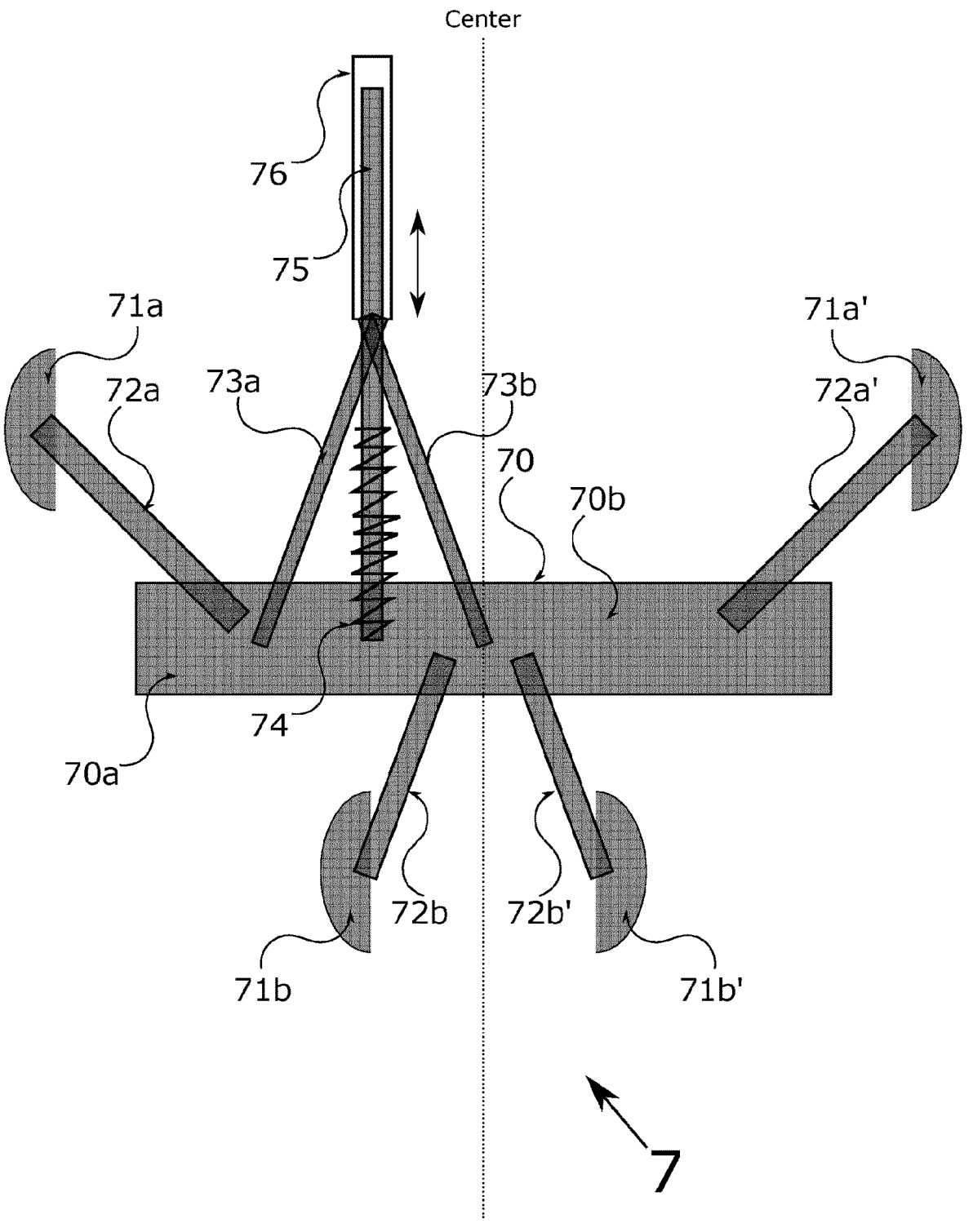
FIG. 6: Tool for mounting an assembled portable device.

A particularly preferred embodiment of the assembled portable device (1) according to the invention is shown in FIGS. 4 and 5 as well as an associated tool (FIG. 6) for attaching the assembled portable device (1) to a cattle or other hoofed or hoof-bearing domesticated animal. In the example shown in FIG. 4, said discharge unit (3) is a meander structure comprising perforations that allow said liquid to contact the skin of an animal through said perforations.

In accordance with a particularly preferred embodiment of the assembled portable device (1) said reservoir bag (2), said flexible hose (4), and said discharge unit (3) are inserted into a cover (6), in which at least one bias part (6c) enclosing said flexible hose (4) is made of a stretchable, elastic fabric, preferably a stretchable, elastic and woven fabric. By encasing the flexible hose (4) in a stretchable elastic fabric, typically a woven fabric, it is ensured that if, for example, the animal accidentally steps on the mentioned discharge unit (3) towards the tip of the animal's hoof, then the said discharge unit (3) is pulled back towards said reservoir bag (2) by said bias part (6c). This principle is illustrated in FIGS. 4 and 5. Such elastic, stretchable, typically woven, fabrics are well known within animal husbandry and are not further described herein.

In an embodiment, said cover (6) comprises a first wing member (6a) comprising said reservoir bag (2), and a second wing member (6b) comprising said discharge unit (3). In an embodiment of this, at least one of said first wing member (6a) or second wing member (6b) is made of an elastic and stretchable fabric, preferably an elastic, stretchable and woven fabric.

In an embodiment of said cover (6), both of said respective wing members (6a,6b) comprise respective opposing and complementary Velcro elements (5a,5a',5b,5b'), such that when one of the wing members mentioned herein (6a, 6b) is folded, for example, around the calf, thigh and/or hoof of an animal, said wing can be assembled and closed with said opposite and complementary Velcro elements (5a, 5a', 5b, 5b') and thereby retain a thus assembled and closed wing (6a,6b) at the place on the animal where it is assembled.

In an embodiment of said cover (6) both said respective wing members (6a,6b) comprise on the one of a said respective wing member's (6a, 6b) respective side opposite to the leg of said hoofed or hoof-bearing domesticated animal, at least two respective pockets (61a,61a',61b,61b') on each wing member (6a,6b). As will be described with reference to FIG. 7, each wing member's (6a,6b) respective pockets (61a,61a',61b,61b') can be prepared and adapted to receive holding elements (71a,71a',71b,71b') included in a tool (7) for attaching a portable device (1) according to this invention to the leg of a hoofed or hoof-bearing domesticated animal.

In accordance with the present invention there is further detailed a tool (7) for attaching a portable device (1) in accordance with the present invention to a hoofed or hoof-bearing domesticated animal, said tool (7) comprising an elongated spring element (70) defining a center line and two halves (70a,70b) of said spring element (70), wherein said spring element (70) further comprises pairwise holding elements (71a,71a'), (71b,71b') connected to said spring element (70) with pairwise spacers (72a,72a') pairwise arranged around said centerline such that each pairwise holding element (71a,71a'), (71b,71b') can be inserted into respective therefore arranged pockets (61a,61a',61b,61b') comprised on a said portable device (1), and where on said spring element (70) a rod (75) is attached away from said center line, which rod (75) comprises an outer member (76) that can be moved relative to said rod (75) along an axis parallel to said center line and at least two opposite legs (73a,73b) attached to said outer member (76), which respective opposing legs (73a,73b) are arranged on a respective half of said two halves (70a,70b) of said spring element (70), such that when said outer member (76) is moved relative to said rod (75) towards said spring element (70), said outer member (76) bends said spring element (70) around an axis defined by said rod (75).

The tool (7) described herein allows, as the spring element (70) is bent into two unequal halves, when the outer member (76) is moved towards the spring element (70), that a portable device (1) according to the present invention further comprising therefore arranged pockets (61a,61a',61b,61b'), which portable device (1) is carried on said tool (7) by the herein detailed pairwise holding elements (71a,71a'), (71b, 71b') by that these pairwise holding elements have been inserted into the therefore arranged pockets (61a,61a',61b, 61b') comprised on the portable device (1), then first that Velcro element on that wing member (6a,6b) of the portable device (1) carried by a short half of the spring element (70a) will swing towards the leg of the livestock, and thereafter that Velcro element on the wing member (6a,6b) carried by a long half of the spring element (70b), whereby the portable device (1) is assembled around the leg of the livestock before use.

After assembling the portable device (1) around the leg of the livestock, a user can first extract the pairwise holding member (71a,71a') carrying said reservoir bag (2) and use the pairwise holding member (72a,72a') carrying said discharger unit (3), to push said discharger unit (3) into place and extend said bias part (63).

In certain embodiments of said tool (7), said tool (7) further comprises a spring (74) arranged around said rod (75) such that said spring (74) is activated and held in an activated position when said outer member (76) is moved from a first position towards said spring element (70), and can be released from said activated position, whereby said outer member (76) is brought back to said first position.

In a further embodiment of said tool (7) said spring element (70) is manufactured in spring steel.

CLOSING COMMENTS

Whereas the present invention has been described in detail for illustrating the present invention broadest possible, it will be clear to the skilled person that the present description is solely with this purpose in mind and that variations of the teachings detailed in the present disclosure as detailed e.g., in drawings, description, and claims can be exercised by a skilled person.

The terms "comprise" or "comprising" as used in the claims do not exclude other elements or method steps. The indefinite articles "a" or "an" do not exclude a plurality of elements. A reference number used in a claim shall not be construed limiting on the present teachings.

The invention claimed is:

1. A portable device for dispensing a disinfectant in liquid form to effect complete or partial healing of a lameness in a hoofed or hoof-bearing domesticated animal, which lameness is responsive to said disinfectant; wherein said portable device comprises:

a liquid-tight reservoir bag defining a bag interior in which a volume of said disinfectant can be contained, a bag inner side which encloses said bag interior, and a bag outer side, whereby a bag wall is defined between said bag inner side and said bag outer side, and comprising at least one bag opening from the bag interior to the surrounding space, such that said at least one bag opening spans said bag wall between said bag inner side and said bag outer side;

a discharge unit arranged to discharge said disinfectant from said bag interior onto an area of the skin of a hoofed or hoof-bearing domesticated animal during use and comprising a nozzle for regulating a flow rate of said disinfectant through said discharge unit;

a flexible hose for establishing a liquid flow connection for said disinfectant from said bag interior through said at least one bag opening to said discharge unit through said flexible hose during use;

wherein said portable device further comprises one or more fastening means for attaching said portable device to a hoofed or hoof-bearing domesticated animal when using and mounting, respectively, said reservoir bag, discharge unit, and flexible hose, wherein said discharge unit comprising a nozzle is constructed as a flow-through body comprising a body which encloses a flow-through interior that allows a flow of a liquid to pass the discharge unit from a connection section of said flexible hose, through said nozzle and to an opening in said body.

2. A portable device for dosing a disinfectant in liquid form according to claim 1, in which said bag wall is formed of a material that allows compensating for the discharge under-pressure through atmospheric pressure collapse of said bag interior timed with said bag interior being emptied of said disinfecting liquid.

3. A portable device for dispensing a disinfectant in liquid form according to claim 1, wherein said liquid-tight reservoir bag comprises a closable opening in said liquid-tight reservoir bag that allows filling of said disinfectant to the said bag interior.

4. A portable device for dosing a disinfectant in liquid form according to claim 3, wherein said flexible hose comprises respective complementary couplings against both a respective complementary coupling comprised on said at least one bag opening and against a respective complementary coupling included on said connection section.

5. A portable device for dispensing a disinfectant in liquid form according to claim 1, wherein said discharge unit comprises distributor ribs arranged in said flow-through interior downstream of said nozzle.

6. A portable device for dispensing a disinfectant in liquid form according to claim 1, wherein said flexible hose is shape-restoring.

7. A portable device for dispensing a disinfectant in liquid form according to claim 1, wherein said reservoir bag, said flexible hose, and said discharge unit are inserted into a cover, in which at least one bias part enclosing said flexible hose is made of a stretchable, elastic fabric.

8. A portable device for dosing a disinfectant in liquid form according to claim 7, wherein said cover comprises a first wing member comprising said reservoir bag, and a second wing member comprising said discharge unit.

9. A portable device for dosing a disinfectant in liquid form according to claim 8, wherein at least one of said first wing member or second wing member is made of an elastic and stretchable fabric, preferably an elastic, stretchable and woven fabric.

10. A portable device for dispensing a disinfectant in liquid form according to claim 8, wherein on said cover both of said respective wing members comprise respective opposing and complementary Velcro elements.

11. A portable device for dosing a disinfectant in liquid form according to claim 8, wherein said cover comprises on both said respective wing members on the one of a said respective wing member's respective side opposite to the leg of said hoofed or hoof-bearing domesticated animal, at least two respective pockets on each wing member.

12. A portable device for dosing a disinfectant in liquid form according to claim 1, wherein the portable device is configured for use on cattle.

13. A portable device for dispensing a liquid disinfectant according to claim 1, wherein said reservoir bag comprises a plurality of spacers arranged in said bag interior, each respective spacer attached to at least two respective attachment positions on said bag inner side, and wherein each respective spacer is partially compressible in a respective longitudinal direction defined between said two respective attachment positions on said bag inner side.

14. A portable device for dispensing a disinfectant in liquid form according to claim 1, further comprising an opener allowing opening for a flow of said disinfectant from said reservoir bag to said discharge unit.

15. A portable device for dispensing a disinfectant in liquid form to effect complete or partial healing of a lameness in a hoofed or hoof-bearing domesticated animal, which lameness is responsive to said disinfectant; wherein said portable device comprises:

a liquid-tight reservoir bag defining a bag interior in which a volume of said disinfectant can be contained, a bag inner side which encloses said bag interior, and a bag outer side, whereby a bag wall is defined between said bag inner side and said bag outer side, and comprising at least one bag opening from the bag interior to the surrounding space, such that said at least one bag opening spans said bag wall between said bag inner side and said bag outer side;

a discharge unit arranged to discharge said disinfectant from said bag interior onto an area of the skin of a hoofed or hoof-bearing domesticated animal during use and comprising a nozzle for regulating a flow rate of said disinfectant through said discharge unit;

a flexible hose for establishing a liquid flow connection for said disinfectant from said bag interior through said at least one bag opening to said discharge unit through said flexible hose during use;

wherein said portable device further comprises one or more fastening means for attaching said portable device to a hoofed or hoof-bearing domesticated animal when using and mounting, respectively, said reservoir bag, discharge unit, and flexible hose, wherein said reservoir bag comprises a plurality of spacers arranged in said bag interior, each respective spacer attached to at least two respective attachment positions on said bag inner side, and wherein each respective spacer is partially compressible in a respective longitudinal direction defined between said two respective attachment positions on said bag inner side.

16. A portable device for dispensing a disinfectant in liquid form to effect complete or partial healing of a lameness in a hoofed or hoof-bearing domesticated animal, which lameness is responsive to said disinfectant; wherein said portable device comprises:

a liquid-tight reservoir bag defining a bag interior in which a volume of said disinfectant can be contained, a bag inner side which encloses said bag interior, and a bag outer side, whereby a bag wall is defined between said bag inner side and said bag outer side, and comprising at least one bag opening from the bag interior to the surrounding space, such that said at least one bag opening spans said bag wall between said bag inner side and said bag outer side;

a discharge unit arranged to discharge said disinfectant from said bag interior onto an area of the skin of a hoofed or hoof-bearing domesticated animal during use and comprising a nozzle for regulating a flow rate of said disinfectant through said discharge unit;

a flexible hose for establishing a liquid flow connection for said disinfectant from said bag interior through said at least one bag opening to said discharge unit through said flexible hose during use;

wherein said portable device further comprises one or more fastening means for attaching said portable device to a hoofed or hoof-bearing domesticated animal when using and mounting, respectively, said reservoir bag, discharge unit, and flexible hose, further comprising an opener allowing opening for a flow of said disinfectant from said reservoir bag to said discharge unit.

17. A tool for attaching a portable device according to claim 11 to a hoofed or hoof-bearing domesticated animal, said tool comprising an elongated spring element defining a center line and two halves of said spring element, wherein said spring element further comprises pairwise holding elements, connected to said spring element with pairwise spacers pairwise arranged around said centerline such that each pairwise holding element can be inserted into respective therefore arranged pockets comprised on a said portable device, and where on said spring element a rod is attached away from said center line, which rod comprises an outer member that can be moved relative to said rod along an axis parallel to said center line and at least two opposite legs attached to said outer member, which respective opposing legs are arranged on a respective half of said two halves of said spring element, such that when said outer member is moved relative to said rod towards said spring element, said outer member bends said spring element around an axis defined by said rod.

18. A tool for attaching a portable device according to claim 17 to a hoofed or hoof-bearing domesticated animal, said tool further comprising a spring arranged around said rod such that said spring is activated and held in an activated position when said outer member is moved from a first position towards said spring element, and can be released from said activated position, whereby said outer member is brought back to said first position.

19. A tool for attaching a portable device according to claim 17 to a hoofed or hoof-bearing domesticated animal, wherein said spring element is manufactured in spring steel.

20. A set of parts further comprising a tool according to claim 17.

21. A set of parts, comprising a reservoir bag, a discharge unit, a flexible hose, and one or more fastening means for fastening said reservoir bag, said discharge unit and said flexible hose on a hoofed or hoof-bearing domesticated animal in use, which set of parts when assembled forms a portable device for dosing a disinfectant in liquid form according to claim 1.

\* \* \* \* \*